(12) United States Patent
Schanz et al.

(10) Patent No.: US 7,147,137 B2
(45) Date of Patent: Dec. 12, 2006

(54) SUPPORT FOR FIXING AUXILIARY ELECTRONIC APPLIANCES ON TWO-WHEELERS

(76) Inventors: Jochen Schanz, Auf dem Zimmermann 7-9, Niedereschach (DE) 78078; Herbert Schwarz, Auf dem Zimmermann 7-9, Niedereschach (DE) 78078

( * ) Notice: Subject to any disclaimer, the term of this patent is extended or adjusted under 35 U.S.C. 154(b) by 287 days.

(21) Appl. No.: 10/492,304

(22) PCT Filed: Oct. 21, 2002

(86) PCT No.: PCT/EP02/11762

§ 371 (c)(1),
(2), (4) Date: Apr. 12, 2004

(87) PCT Pub. No.: WO03/035458

PCT Pub. Date: May 1, 2003

(65) Prior Publication Data

US 2005/0000988 A1 Jan. 6, 2005

(30) Foreign Application Priority Data

Oct. 23, 2001 (DE) ................. 101 51 566

(51) Int. Cl.
*B62J 7/06* (2006.01)
(52) U.S. Cl. .............. 224/420; 224/448; 224/452; 224/453
(58) Field of Classification Search ............... 224/425, 224/452, 447, 448, 449, 41.12, 412, 413, 224/418, 419, 420, 421, 422, 423, 424, 426, 224/427, 428, 429, 430, 431, 432, 433, 434, 224/435–402; 248/231.81, 905, 311.2; 211/41.12
See application file for complete search history.

(56) References Cited

U.S. PATENT DOCUMENTS

| | | | | |
|---|---|---|---|---|
| 593,978 A * | 11/1897 | Boehm | ................. | 224/462 |
| 1,817,424 A * | 8/1931 | Smiley | ................. | 24/67.11 |
| 1,828,417 A * | 10/1931 | Keleher | ................. | 232/33 |
| 2,263,956 A * | 11/1941 | Russell | ................. | 248/311.2 |
| 2,634,527 A * | 4/1953 | Pletscher | ................. | 40/643 |
| 3,159,369 A * | 12/1964 | Wiczer | ................. | 248/305 |
| D203,101 S * | 12/1965 | Holder | ................. | D3/218 |
| 4,190,182 A * | 2/1980 | Hickey | ................. | 294/147 |
| 4,312,465 A * | 1/1982 | Sinkhorn et al. | ................. | 224/414 |
| 4,339,060 A * | 7/1982 | Braida, Jr. | ................. | 244/428 |
| 4,489,307 A | 12/1984 | Nagano | | |
| 4,606,521 A * | 8/1986 | Williams | ................. | 248/214 |
| 4,823,673 A * | 4/1989 | Downing | ................. | 89/37.04 |
| D306,150 S * | 2/1990 | Macke | ................. | D12/407 |
| 5,143,335 A * | 9/1992 | Frankel | ................. | 248/215 |
| 5,639,049 A * | 6/1997 | Jennings et al. | ................. | 248/74.2 |
| 6,332,373 B1 | 12/2001 | Iteya et al. | | |
| 6,402,417 B1 | 6/2002 | Okamoto | | |
| 6,423,443 B1 | 7/2002 | Tsuboi et al. | | |
| 6,634,530 B1 * | 10/2003 | Black | ................. | 224/401 |

FOREIGN PATENT DOCUMENTS

EP 0 499 870 8/1992

* cited by examiner

*Primary Examiner*—Tri M. Mai
(74) *Attorney, Agent, or Firm*—Gudrun E. Huckett

(57) ABSTRACT

A support for attachment of auxiliary electronic devices on two-wheelers has a support member shaped to match an auxiliary electronic device to be inserted. An actuator is provided that has an actuator part and a locking pawl configured to lock the auxiliary device received in the support member. The actuator enables insertion and removal as well as securing of the auxiliary electronic device. A spring element acts on the actuator. The spring element is a spring steel sheet that is rotatable about a flexion point or an axis.

12 Claims, 4 Drawing Sheets

SUPPORT FOR FIXING AUXILIARY ELECTRONIC APPLIANCES ON TWO-WHEELERS

BACKGROUND OF THE INVENTION

The invention relates to a support for attaching auxiliary electronic devices on two-wheelers, wherein a support member with a matching shape encloses the auxiliary electronic device to be inserted and wherein an actuator, loaded by a spring element and comprising an actuator part and a locking pawl to be locked with the auxiliary device, enables insertion and removal as well as securing of the auxiliary electronic device, Such a support is disclosed in DE 100 09 671 A1. The actuator part is configured as a slide that is pretensioned by a spring. The locking pawl is a Z-shaped part that cooperates with the slide. Disadvantageously, the support is complex with regard to its construction and is difficult to operate.

EP 1 029 779 A2, U.S. Pat. Nos. 4,489,307, 4,339,060, and JP 2000 335 463 A each disclose a support for fastening auxiliary electronic devices wherein the support with its matching shape encloses the auxiliary electronic device to be inserted and enables by means of an actuator the insertion and removal as well as securing of the auxiliary device.

The support disclosed in U.S. Pat. No. 4,339,060 is a battery support for a bicycle wherein, after insertion of the battery into the support, a pivotable bracket locks by means of an undulated spring steel sheet on a corresponding counter member of the support. The spring steel sheet is not locked with the auxiliary device itself.

SUMMARY OF THE INVENTION

The object of the present invention is to further develop the support of the aforementioned kind such that the auxiliary electronic device can be inserted into and released from the support easily, quickly, and with minimal force expenditure.

As a solution to this object it is proposed according to the invention that the support of the aforementioned kind has a spring element in the form of a spring steel sheet that is rotatable about a flexion point or an axis.

Upon insertion of the auxiliary device into the support according to the invention, first the auxiliary device is held by one hand and then inserted into the shape-matched support member, wherein at the same time the actuator part is pushed backward by means of a finger. When the actuator part is released, it locks with the auxiliary device. In the support according to the invention, the insertion of the auxiliary device is thus carried out by a single movement in a single movement direction because the pressure action of the springy steel sheet is oriented parallel to the insertion direction of the auxiliary device. The engagement, enclosing or locking is realized by the locking pawl with spring element that rotates about a flexion point or axis. In this way, the auxiliary device can be inserted into, released from, and also secured within the support easily and quickly.

BRIEF DESCRIPTION OF THE DRAWINGS

Preferred embodiments of the invention are described in the dependent claims. The invention will be explained in more detail in the following with the aid of the drawing. It is shown in:

DESCRIPTION OF PREFERRED EMBODIMENTS

Figure 1:
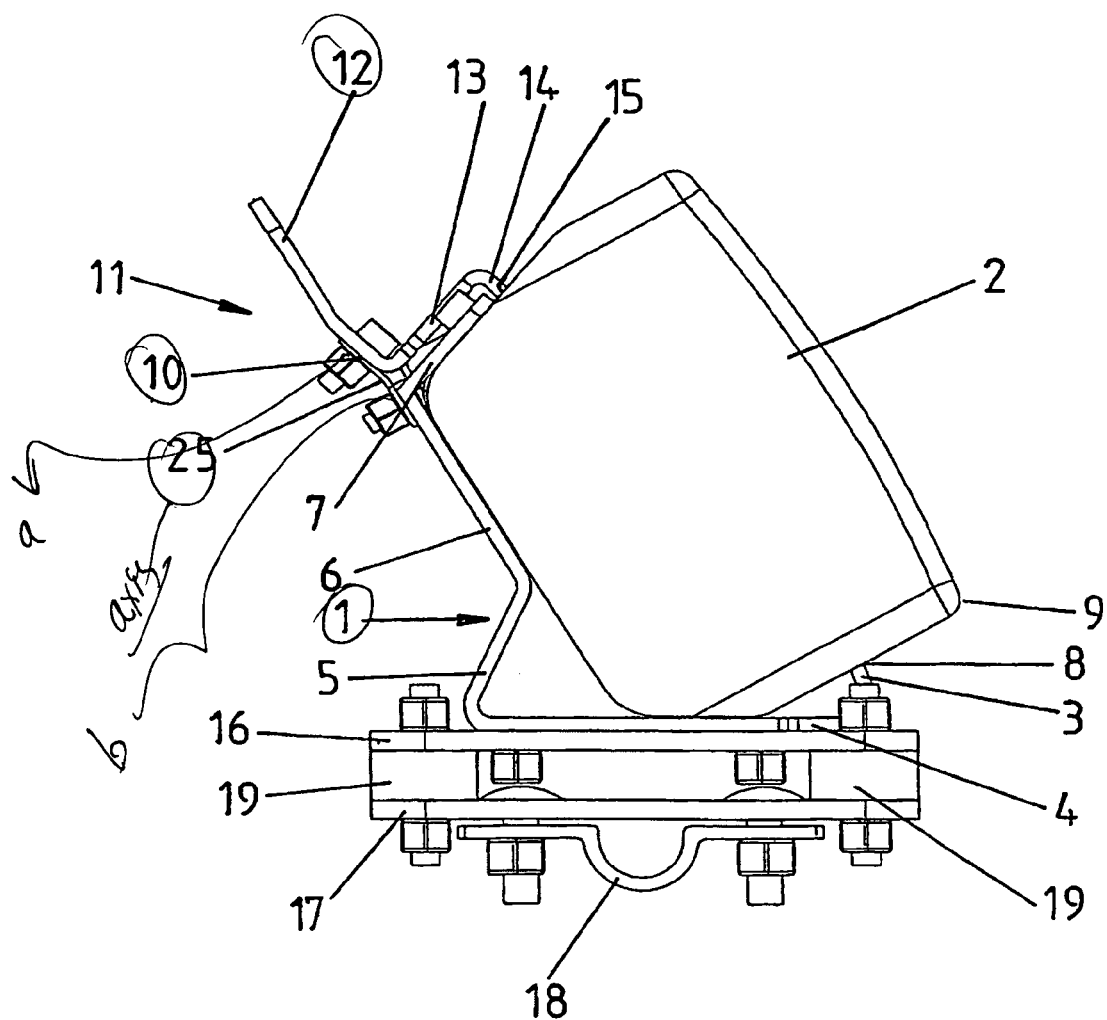
FIG. 1 a side view with an actuator.

The support according to the invention has a support member 1, for example, made of sheet aluminum, that is matched with regard to its shape to the auxiliary electronic device 2 to be inserted. The support member 1 is divided into five support sections 3, 4, 5, 6, 7. The support member 1 is formed as a monolithic part. The first support section 3 and the second support section 4 are arranged approximately in the lower area of the support member 1. The first support section 3 is comprised of to upwardly extending projections that engage a groove 8 of the auxiliary device 2. The groove 8 is arranged on the bottom side of the auxiliary device 2.

Alternatively, the first support section 3 can also engage a bottom edge 9 of the housing of the auxiliary device 2. The second support section 4 extends horizontally and passes into the third support section 5 and subsequently into the fourth support section 6. In the upper area, the fifth support section 7 is provided. The support sections are shape-matched such that the auxiliary device 2 with its top side rests against the fifth support section 7, with its backside against the fourth support section 6, and with a portion of its bottom side against the second support section 4. Approximately at the upper end of the fourth support section 6, at a small distance from its transition into the fifth support section 7, an upwardly projecting spring element 10 in the form of a spring steel sheet is attached by means of screws. The spring steel sheet 10 is flat and has a rectangular cross-section as well as a rectangular shape. The upper end of the spring steel sheet 10 is connected, also by screws, to an actuator 11 that is a monolithic part comprised of an actuator part 12 and a locking pawl 13. The actuator part 12 and the locking pawl 13 are arranged approximately at a 90° angle relative to one another. At the forward end of the locking pawl 13, a locking nose 14 is provided that is bent downwardly approximately at a 90° angle. The locking nose 14 engages a groove 15 provided on the top side of the auxiliary device 2.

When mounting the auxiliary device 2 in the support, the auxiliary device 2 is inserted by using one hand first into the support member 1 wherein the first support section 3 is inserted into the groove 8. At the same time, one finger of the hand actuates the actuator part 12 and forces it somewhat to the rear against the force of the spring steel sheet 10 so that the locking pawl 13 is lifted upwardly. As soon as the auxiliary device 2 rests with its backside on the fourth support section 6, the hand is removed from the auxiliary device 2 and thus also the finger from the actuator part 12 so that the actuator part, forced by the spring steel sheet 10, moves forwardly and the locking pawl 13, in particular, the locking nose 14, engages the groove 15 again. The auxiliary device 2 is now secured. Since the spring steel sheet 10 rotates about a flexion point or axis 25 and, in this way, the pressure action of the spring steel sheet 10 is oriented approximately parallel to the insertion direction of the auxiliary device 2, the insertion of the auxiliary device 2 and also the actuation of the actuator 11 can be carried out in a single movement direction. This makes it possible to insert the auxiliary device 2 into, remove it from, and also secure ir within the support according to the present intention. Alternatively, the locking pawl 13 can also engage one or several device edges in order to secure the auxiliary device 2.

The support has also an upper bottom plate 16 and a lower bottom plate 17. The upper bottom plate 16 is connected to the horizontally extending second support section 4. The lower bottom plate 17 has a securing clamp 18 for attaching the support, for example, on the handlebar of a motorcycle. As a vibration protection or impact protection for the auxiliary electronic device 2, damping elements 19 are arranged between the upper bottom plate 16 and the lower bottom plate 17. In this way, the support member 1 is vibration-decoupled relative to the two-wheeler.

Figure 2:
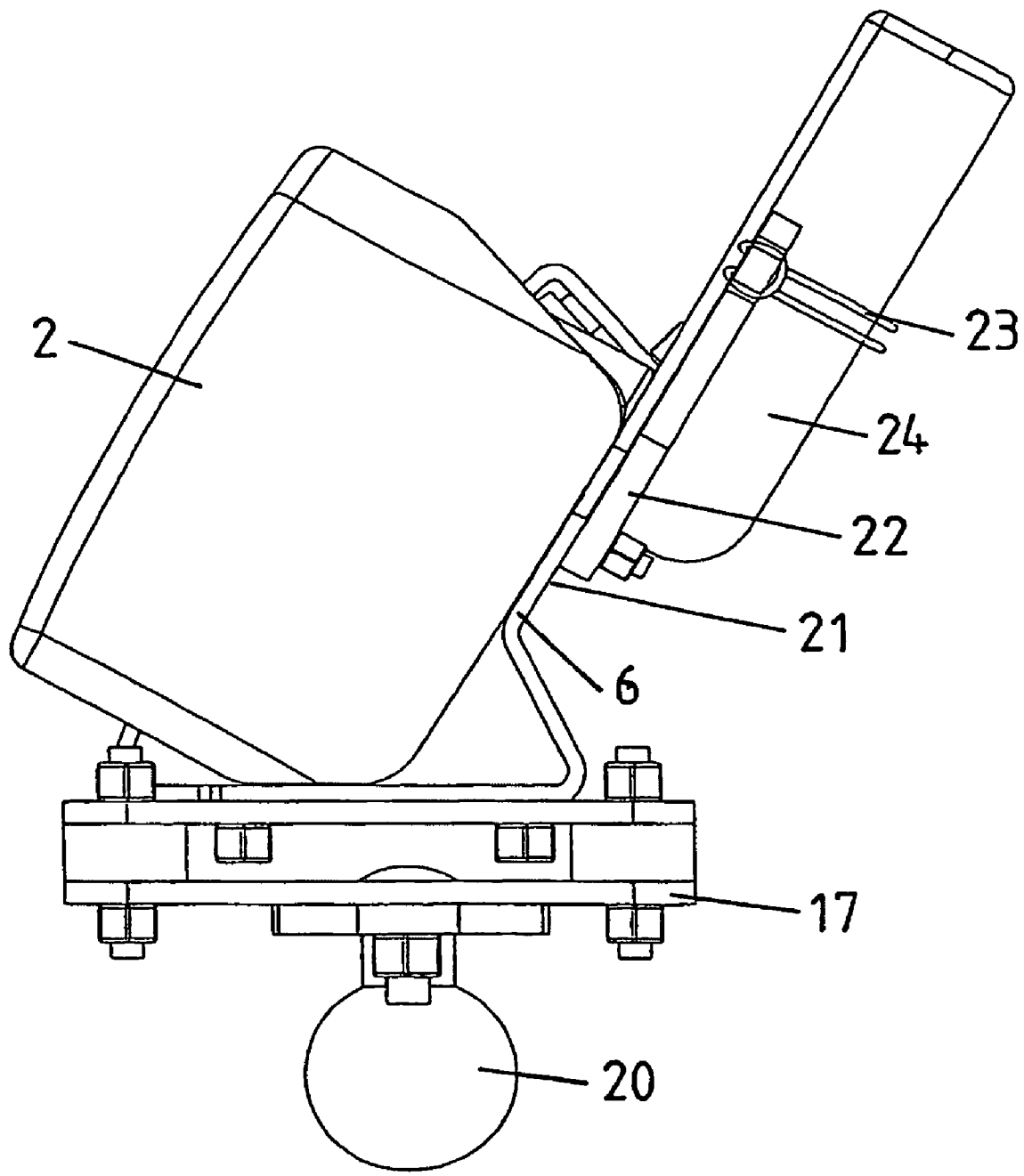
FIG. 2 a side view with antenna holder and antenna.
Figure 3:
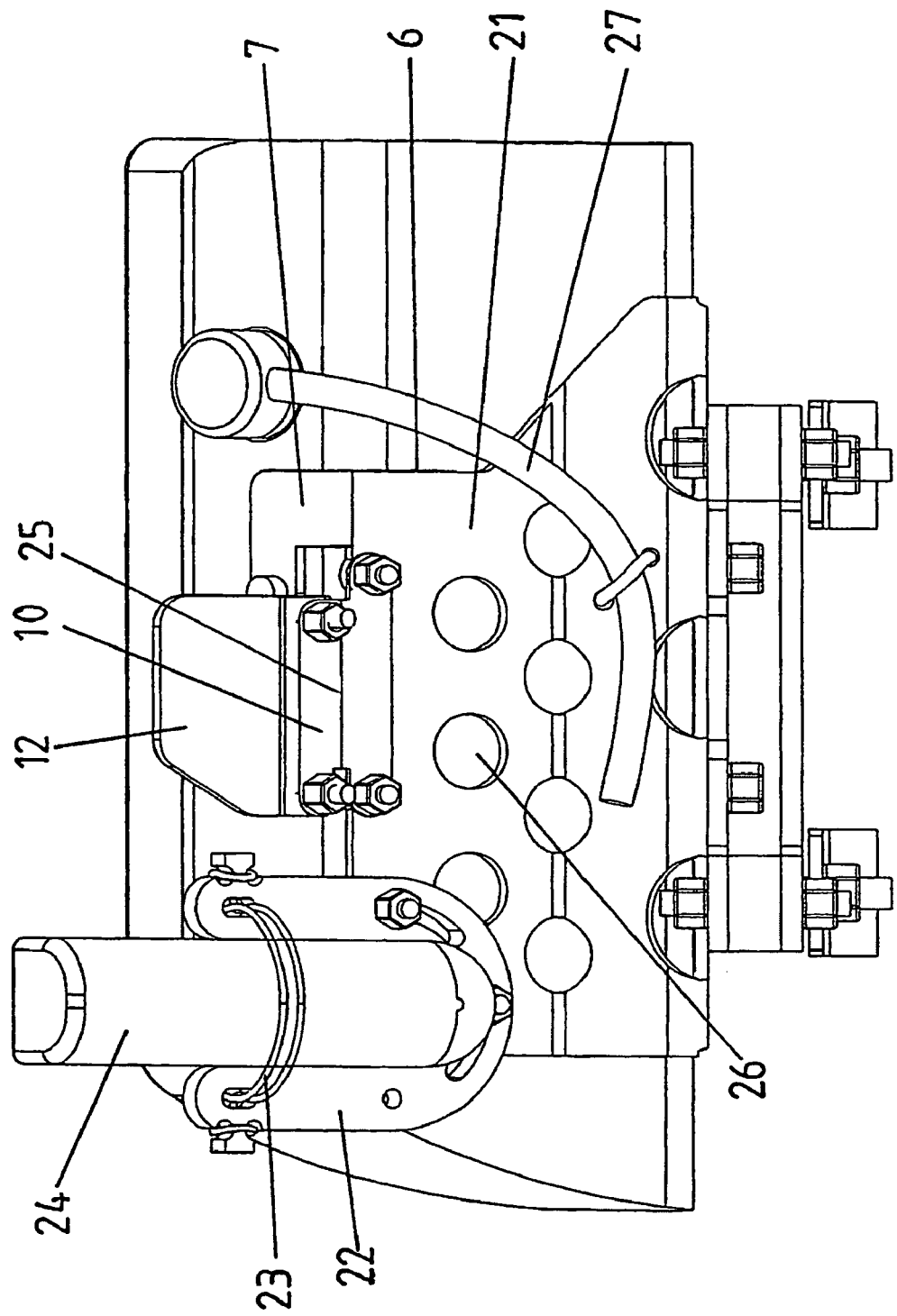
FIG. 3 a view from the rear.
Figure 4:
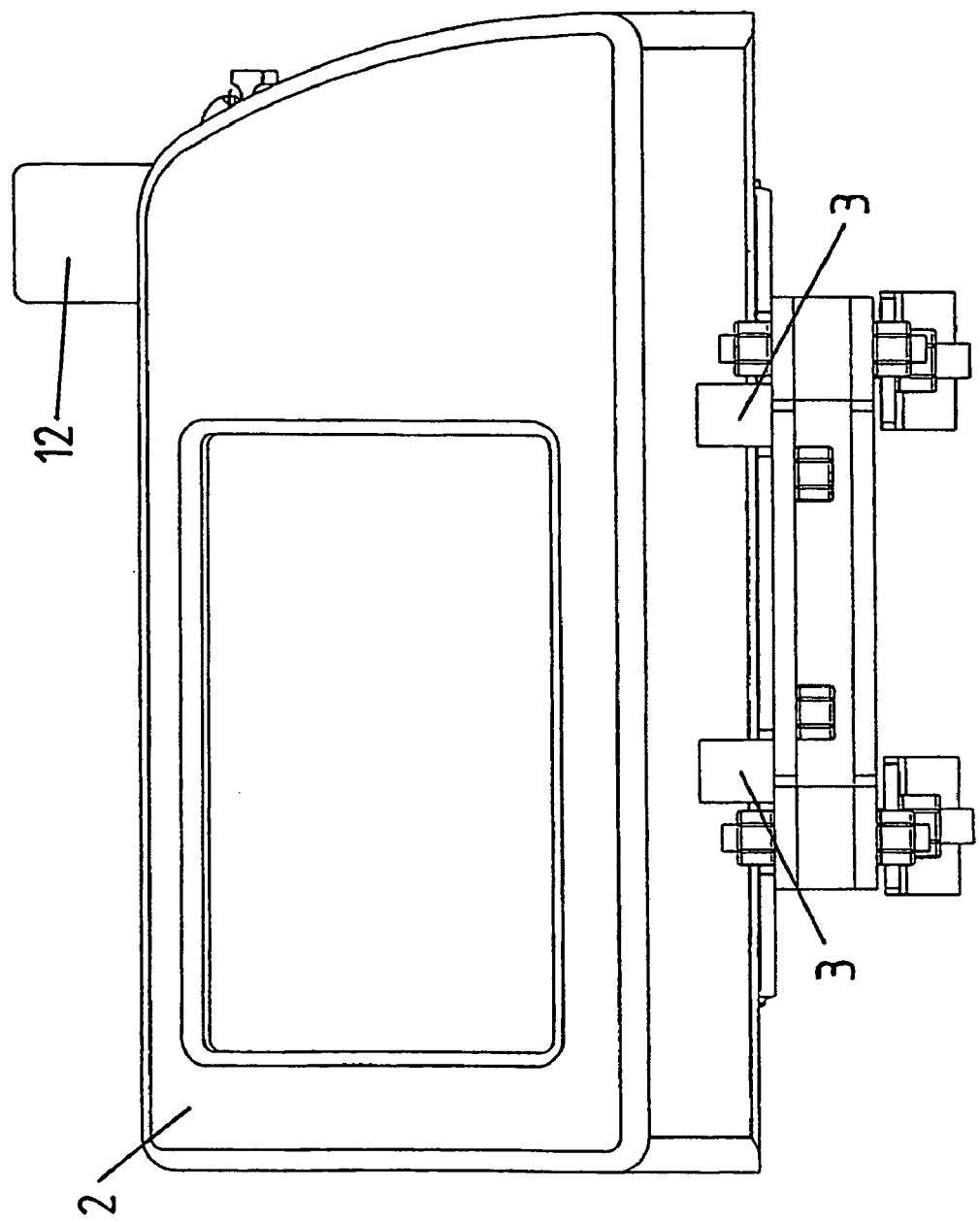
FIG. 4 a front view.

In the embodiment according to FIG. 2, a ball 20 is used instead of the securing clamp 18 for attachment to the handlebar. In this way, an alignment of the auxiliary electronic device 2 and of the support is possible in practically any position. As an alternative, the lower bottom plate 17 can also be fastened directly with connecting elements on the two-wheeler.

On a back wall 21 of the fourth support section 6 a U-shaped antenna support 22 of plastic material is attached. The open end of the U-shape points upwardly. In the upper area of the antenna support 22, a securing rubber band 23 is arranged in order to stabilize the position of the antenna 24. The securing rubber band 23 is threaded through cutouts and is secured on a pin.

Moreover, on the back wall 21 of the fourth securing section 6 openings or cutouts 26 are provided in order to enable the connection of an electric and/or data cable 27.

What is claimed is:

1. A support for attachment of auxiliary electronic devices on two-wheelers, the support comprising:
   a support member shaped to match an auxiliary electronic device to be inserted;
   an actuator comprising an actuator part and a locking pawl configured to lock the auxiliary device received in the support member, wherein the actuator enables insertion and removal as well as securing of the auxiliary electronic device;
   a spring element that is comprised of a spring steel sheet having a first part and a second part adjoining one another and forming an axis where the first and second parts adjoin about which axis the first and second parts are rotatable relative to one another;
   wherein the first part is connected to the actuator part and the second part is connected to the support member such that the actuator part is rotatable about the axis relative to the support member to move the locking pawl from an engaging position for locking the auxiliary device into a disengaging position for releasing the auxiliary device.

2. The support according to claim 1, wherein the locking pawl is configured to engage a groove of the auxiliary electronic device.

3. The support according to claim 1, wherein the locking pawl is configured to engage one or several edges of the auxiliary electronic device.

4. The support according to claim 1, wherein the actuator is located in an upper area of the support member.

5. The support according to claim 1, wherein the actuator part of the actuator projects past a housing of the auxiliary electronic device.

6. The support according to claim 1, wherein the support member has damping elements for vibration-decoupling the support member relative to the two-wheeler.

7. The support according to claim 1, further comprising a bottom plate having bores for enabling direct mounting of the support on the two wheeler, for fastening the support with securing clamps on the two-wheeler, or for fastening a ball to the support.

8. The support according to claim 1, further comprising a U-shaped antenna support mounted on a back wall of the support member.

9. The support according to claim 8, wherein the U-shaped antenna support is position-adjustable.

10. The support according to claim 8, wherein the antenna support is made of plastic material.

11. The support according to claim 8, wherein the U-shaped antenna support comprises a securing rubber band for securing an antenna position.

12. The support according to claim 8, wherein the back wall has cutouts for enabling a connection of electric and/or data lines to the auxiliary electronic device.

* * * * *